United States Patent
Wu

(10) Patent No.: US 9,662,995 B2
(45) Date of Patent: May 30, 2017

(54) BATTERY CHARGING SYSTEM AND APPARATUS AND METHOD FOR ELECTRIC VEHICLE

(71) Applicant: HON HAI PRECISION INDUSTRY CO., LTD., New Taipei (TW)

(72) Inventor: E-In Wu, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 143 days.

(21) Appl. No.: 14/791,944

(22) Filed: Jul. 6, 2015

(65) Prior Publication Data
US 2017/0008412 A1 Jan. 12, 2017

(51) Int. Cl.
*H02J 7/00* (2006.01)
*B60L 11/18* (2006.01)

(52) U.S. Cl.
CPC ....... *B60L 11/1835* (2013.01); *B60L 11/1816* (2013.01); *B60L 11/1846* (2013.01)

(58) Field of Classification Search
CPC .................................................... Y02T 90/14
USPC ........................................................ 320/109
See application file for complete search history.

(56) References Cited

U.S. PATENT DOCUMENTS

| | | | | |
|---|---|---|---|---|
| 6,157,162 A | * | 12/2000 | Hayashi | B60L 11/1818 320/104 |
| 6,764,373 B1 | * | 7/2004 | Osawa | B25J 19/005 180/169 |
| 6,957,712 B2 | * | 10/2005 | Song | A47L 9/009 180/117 |
| 2002/0120364 A1 | * | 8/2002 | Colens | A47L 11/4005 700/262 |
| 2004/0182614 A1 | * | 9/2004 | Wakui | B25J 5/007 180/7.1 |

FOREIGN PATENT DOCUMENTS

| CN | 103023091 A | 4/2013 |
|---|---|---|
| CN | 104333080 A | 2/2015 |

* cited by examiner

*Primary Examiner* — Yalkew Fantu
(74) *Attorney, Agent, or Firm* — Steven Reiss

(57) ABSTRACT

A battery charging system for an electric vehicle includes a movement control module configured to control a robot arm of a charging apparatus to move; a charging control module configured to control a feeding coupler of the battery charging apparatus to output electric current; a camera module configured to obtain an image of a location of a receiving coupler of the electric vehicle; and a comparing module configured to compare the image with a predefined image stored in a memory unit, the predefined image being of an open state of a receiving coupler of a same model as the electric vehicle. The movement control module controls the feeding coupler couple with the receiving coupler, when the image matches with the predefined image. The present disclosure also supplies a battery charging apparatus and a battery charging method.

20 Claims, 11 Drawing Sheets

BATTERY CHARGING SYSTEM AND APPARATUS AND METHOD FOR ELECTRIC VEHICLE

CROSS-REFERENCE TO RELATED APPLICATIONS

This application is related to one co-pending U.S. patent application Ser. No. 14/791,874, entitled "BATTERY CHARGING APPARATUS FOR ELECTRIC", by "E-IN WU". Such application has the same assignee as the instant application and is concurrently filed herewith. The disclosure of the above-identified applications is incorporated herein by reference.

FIELD

The subject matter herein generally relates to a battery charging system, apparatus, and method for supplying electric energy to a battery of a battery-powered electric vehicle through a receiving coupler mounted on the electric vehicle.

BACKGROUND

Recent years have seen progress in the development of electric vehicles as means of transportation for reducing the rate of consumption of existing fuels and avoiding possible environmental pollution. Electric vehicles are powered by electric energy powered stored in and supplied from a batteries mounted in the electric vehicle. The batteries usually to be charged by a battery charging apparatus.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
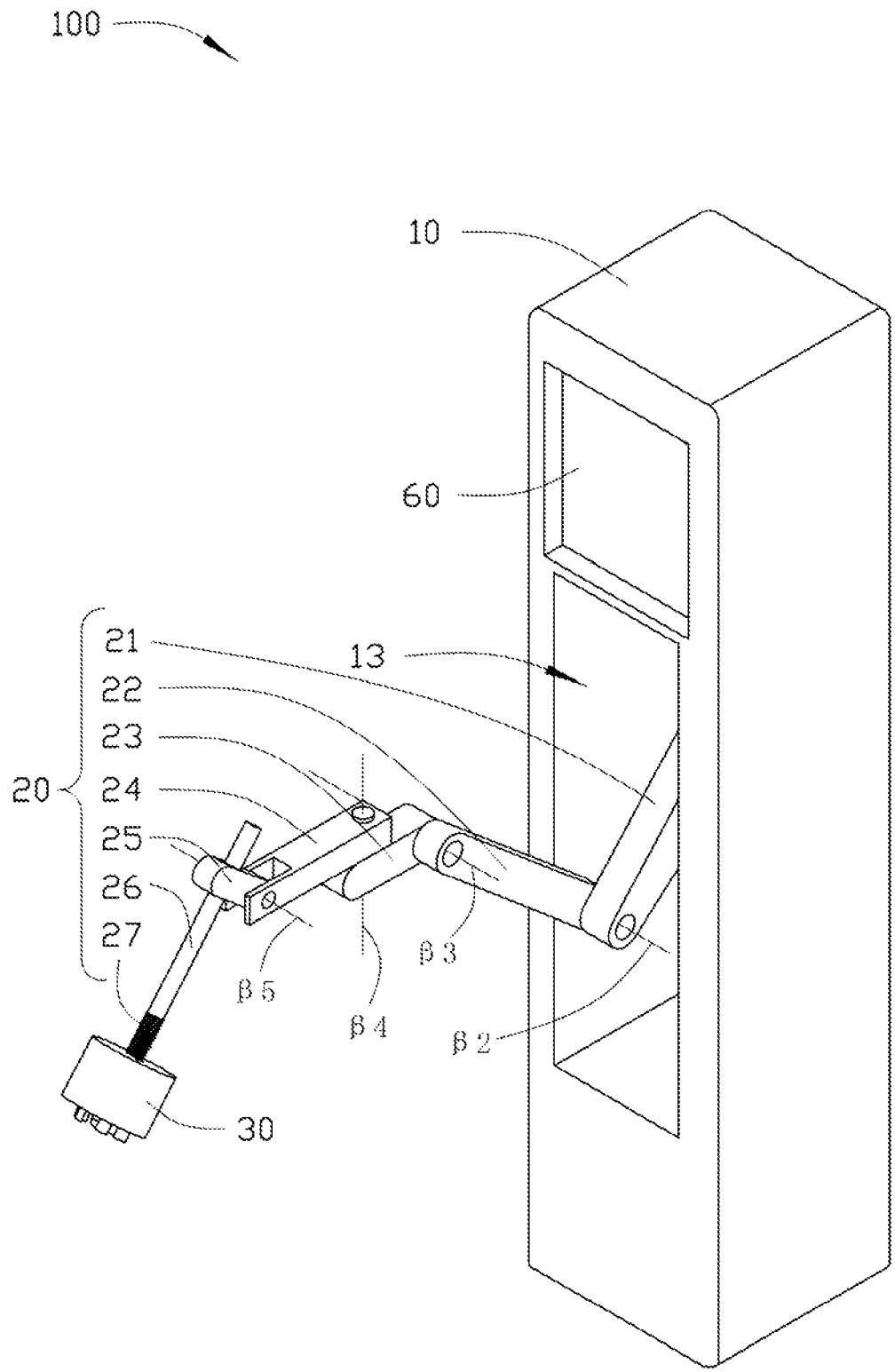
FIG. 1 illustrates an isometric view of a battery charging apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is in relation to a battery charging system, a battery charging apparatus, and a battery charging method. The battery charging system for an electric vehicle can include a movement control module configured to control a robot arm of a charging apparatus move; a charging control module configured to control a feeding coupler of the battery charging apparatus to output electric current; a camera module configured to obtain an image of a location of a receiving coupler of the electric vehicle; and a comparing module configured to compare the image of the location of the receiving coupler of the electric vehicle with a predefined image stored by a memory unit, the predefined image being of an open state of a receiving coupler of a same model as the electric vehicle. The movement control module controls the feeding coupler couple with the receiving coupler, when the image of the location of the receiving coupler matches the predefined image.

The battery charging apparatus can include a charging body, a robot arm movably positioned on the charging body, a feeding coupler positioned on the robot arm and configured to supply electric power to the electric vehicle, a camera unit positioned on the feeding coupler and configured to capture an image of a location of a receiving coupler of the electric vehicle; and a processing unit. The processing unit can include a movement control module configured to control the robot arm move, a charging control module configured to control the feeding coupler output electric current, a camera module configured to obtain an image of the location of the receiving coupler from the camera unit, and a comparing module configured to compare the image of the location of the receiving coupler of the electric vehicle with a predefined image stored by a memory unit, the predefined image being of an open state of a receiving coupler of a same model as the electric vehicle. The movement control module controls the feeding coupler couple with the receiving couple when the image of the receiving coupler matches the predefined image.

The battery charging method can be described as follow. A robot arm of the battery charging apparatus is controlled to move the feeding coupler of the battery charging apparatus towards a receiving coupler of an electric vehicle, until the feeding coupler is spaced from the receiving coupler with a predefined distance. An image of the receiving coupler is obtained. The image of the location of the receiving coupler of the electric vehicle is compared with a predefined image to determine whether the image of the receiving coupler match the predefined image, and the predefined image is of an open state of a receiving coupler of a same model as the electric vehicle. The feeding coupler is controlled to couple with the receiving coupler via the robot arm, when the image of the receiving coupler matches the predefined image. The feeding coupler is controlled to supply current to the electric vehicle. The feeding coupler is controlled to stop output electric current. The robot arm is controlled to release the feeding coupler from the receiving coupler.

Figure 5:
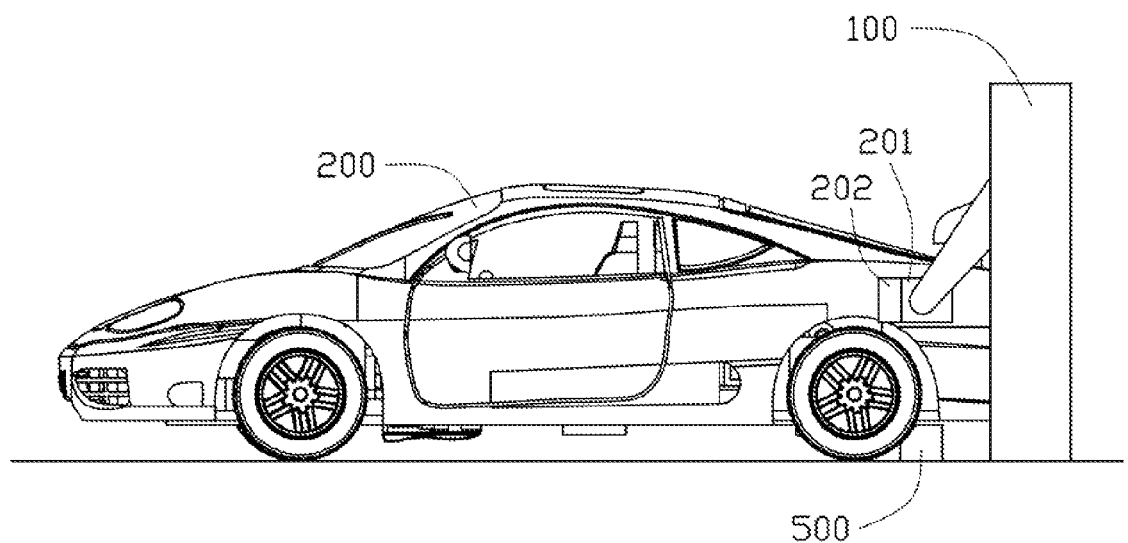
FIG. 5 is a schematic diagram of the battery charging apparatus supplying electric energy to an eclectic vehicle.

FIG. 1 shows a battery charging apparatus 100 for automatically supplying electric energy to an electric vehicle 200 (as shown in FIG. 5). The battery charging apparatus 100 can include a charging body 10, a robot arm 20, a feeding coupler 30 positioned on the robot arm 20, and a controller 60. The robot arm 20 can be movably mounted on the charging body 10. The controller 60 can control the robot arm 20 to couple the feeding coupler 30 with a receiving coupler 201 (as shown in FIG. 5) of the electric vehicle 200 for charging.

The charging body 10 can define a receiving portion 13 for receiving the robot arm 20 and the feeding coupler 30.

Figure 2:
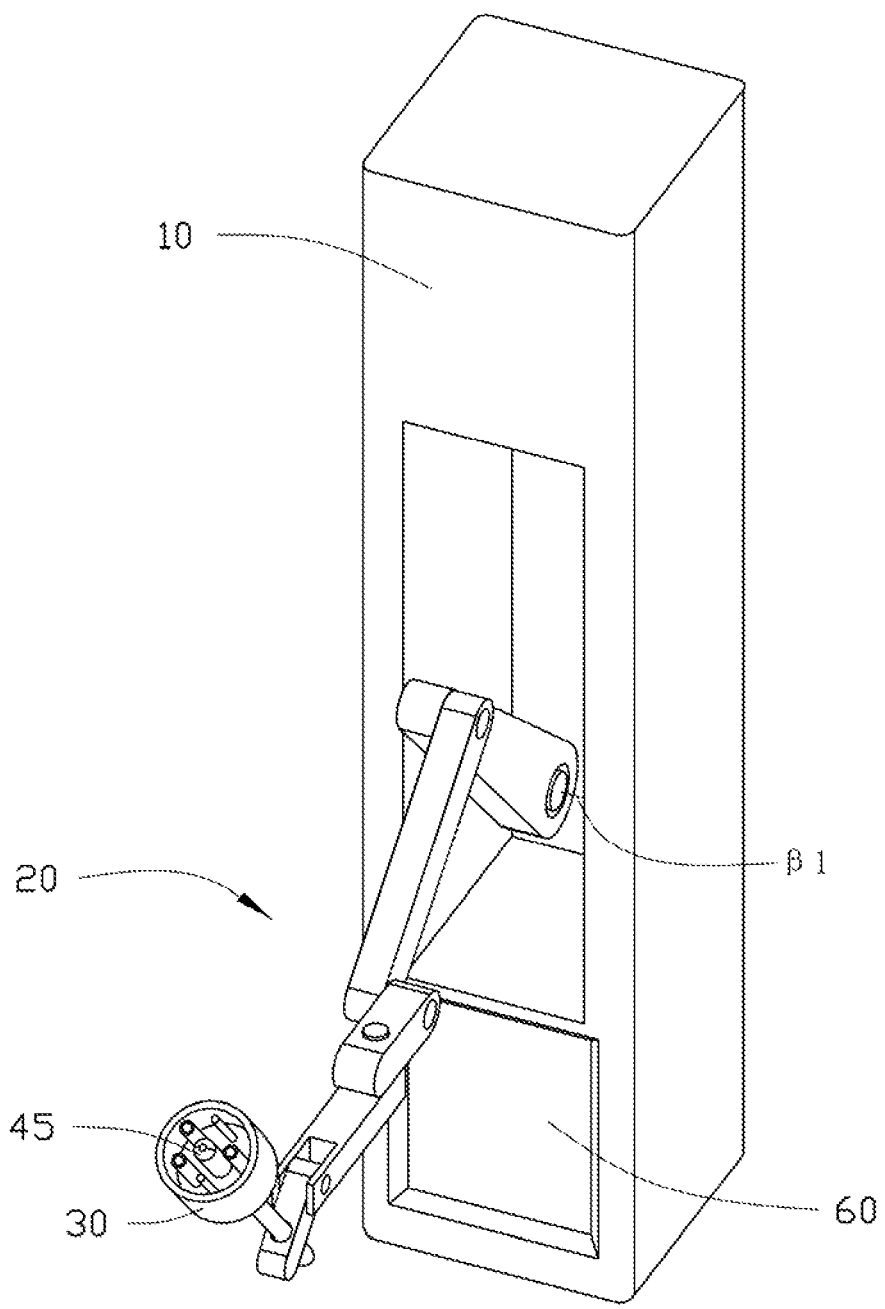
FIG. 2 is similar to FIG. 1, but from another angle.

The robot arm 20 can be a multi-axis robot arm for accurately coupling the feeding coupler 30 with the receiving coupler 201. The robot arm 20 can include a first arm 21, a second arm 22, a third arm 23, a fourth arm 24, a fifth arm 25, and a sixth arm 26, and an elastic member 27. As shown in FIG. 2, a first end portion of the first arm 21 can be rotatably coupled with a sidewall of the receiving portion 13 about a first axis β1.

Referring to FIG. 1 again, a first end portion of the second arm 22 can be rotatably coupled with a second end portion of the first arm 21 about a second axis β2. A first end portion of the third arm 23 can be rotatably coupled with a second end portion of the second arm 22 about a third axis β3. A first end portion of the fourth arm 24 can be rotatably coupled with a second end portion of the third arm 23 about a fourth axis β4. A first end portion of the fifth arm 25 can be rotatably coupled with a second end portion of the fourth arm 24 about a fifth axis β5. The first axis β1 can be substantially vertical to the sidewall of the receiving portion 13. The second axis β2 and the third axis β3 can be substantially parallel to the first axis β1. The fourth axis β4 can be substantially vertical to the first axis β1. The fifth β5 can be substantially vertical to the fourth axis β4.

The sixth arm 26 can be coupled to a second portion of the fifth arm 25. The feeding coupler 30 can be positioned on an end portion of the sixth arm 26 and positioned away from the fifth arm 25. The elastic member 27 can be movably sleeved on the sixth arm 26 and resist with the feeding coupler 30. The elastic member 27 can correct a position deviation when the feeding coupler 30 mates with the receiving coupler 201. The elastic member 27 can also protect the feeding coupler 30 from a cushion. The feeding coupler 30 can be moved to couple with the receiving coupler 201. In the illustrated embodiment, a driver (not shown) is positioned in the fifth arm 25, and the sixth arm 26 can be driven by the driver for pushing the feeding coupler 30 to mate with the receiving coupler 201. A rotation of the first arm 21 around the first axis β1 and a rotation of the second arm 22 around the second axis β2 can be for adjusting a height of the feeding coupler 30 and a distance between the feeding coupler 30 and the electric vehicle 200. A rotation of the third axis β3 can be used for further adjusting the height of the feeding coupler 30. A rotation of the fourth axis β4 can be for aligning the feeding coupler 30 with the electric vehicle 200, when the electric vehicle 200 stops in a tilt position relative to the charging body 10. A rotation of the fifth axis β5 can be for adjusting angles of the feeding coupler 30 relative to the electric vehicle 30. Other structures of the robot arm 20, such as reducers, connecting structures between neighbor arm structures, driving mechanisms, are not described here, for simplify.

In other embodiments, the third arm 23, the fourth arm 24, the fifth arm 25, and a sixth arm 26 can be omitted, the feeding coupler 30 can be directly positioned on the second arm 22. The number of the arms of the robot arm 20 and modes of motion of each arm can be designed as required.

The controller 60 can control the movements of the robot arm 20 and the feeding coupler 30.

Figure 3:
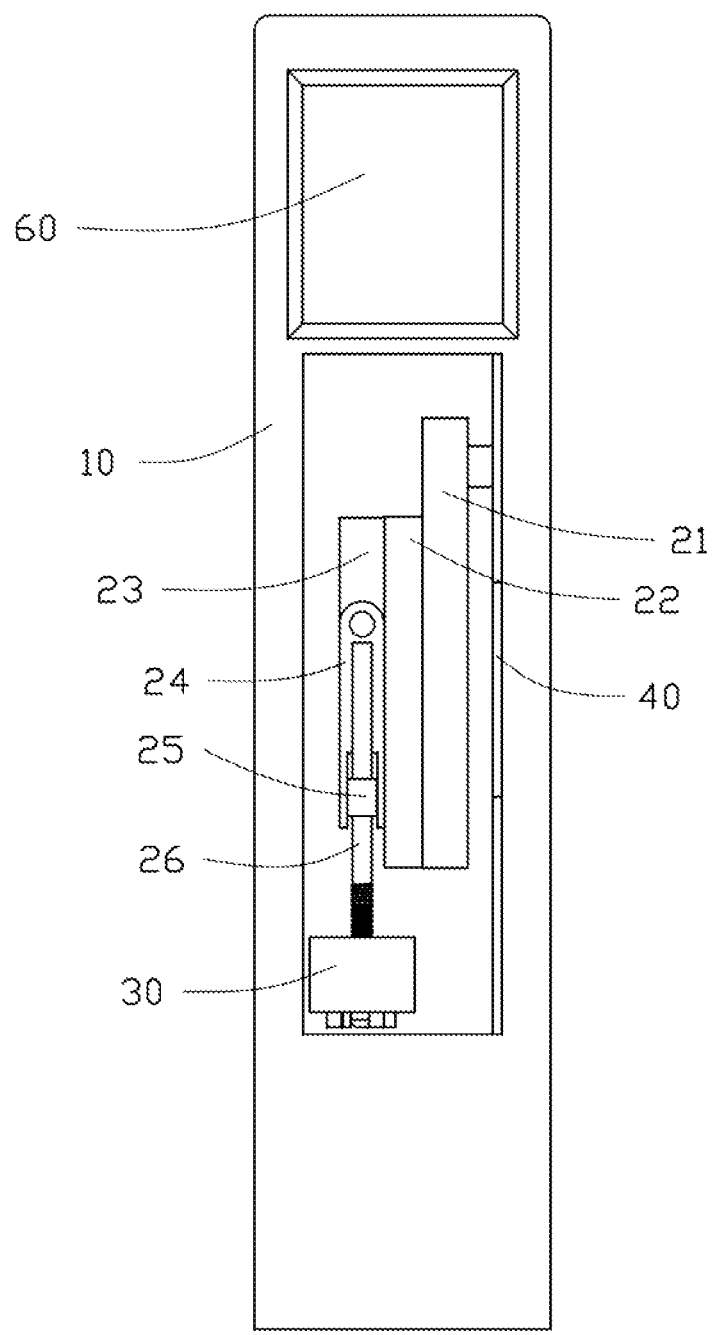
FIG. 3 illustrates that a robot arm of the battery charging apparatus received in a receiving portion of the battery charging apparatus.
Figure 4:
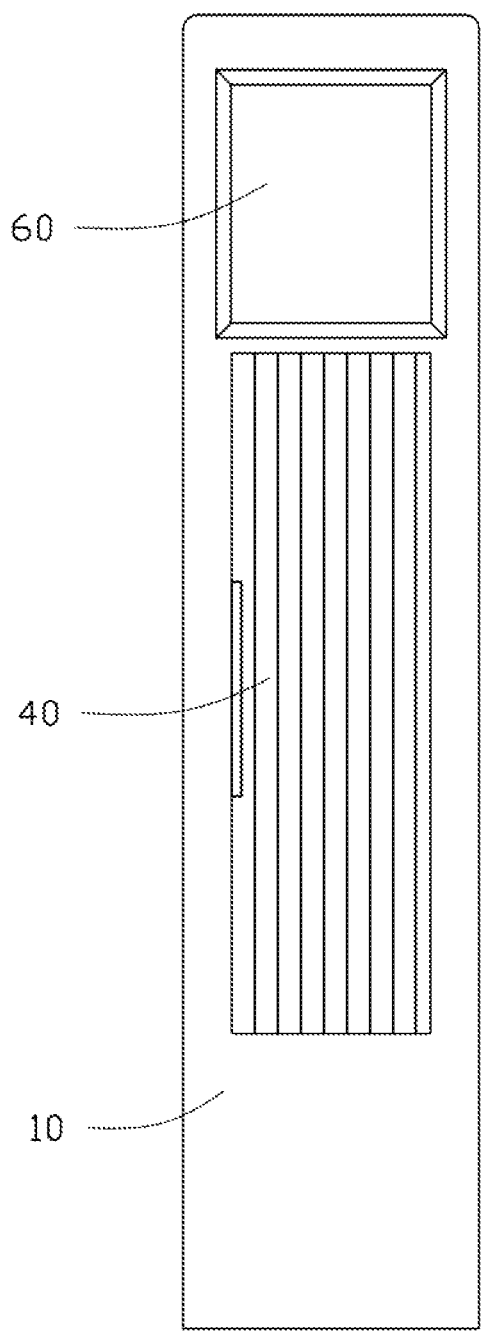
FIG. 4 illustrates that a protective door of the battery charging apparatus closes the receiving portion.

FIGS. 3 and 4 show that the battery charging apparatus 100 can further include a protective door 40. The protective door 40 can be movably mounted on the charging body 10 and positioned adjacent to the receiving portion 13 for closing the robot arm 20 and the feeding coupler 30 in the receiving portion 13, such that, when the battery charging apparatus 100 is in an unused state, the robot arm 20 and the feeding coupler 30 can be protected from dust and water. In the illustrated embodiment, the protective door 40 is a door that can be controlled to open or close by the controller 60. In the illustrative embodiment, the protective door 40 is configured to coil or roll up. In other embodiments, the protective door 40 can be designed to be other suitable doors, such as a transparent door pivotally coupled to the charging body 10, and the protective door 40 can be locked with the charging body 10.

Figure 6:
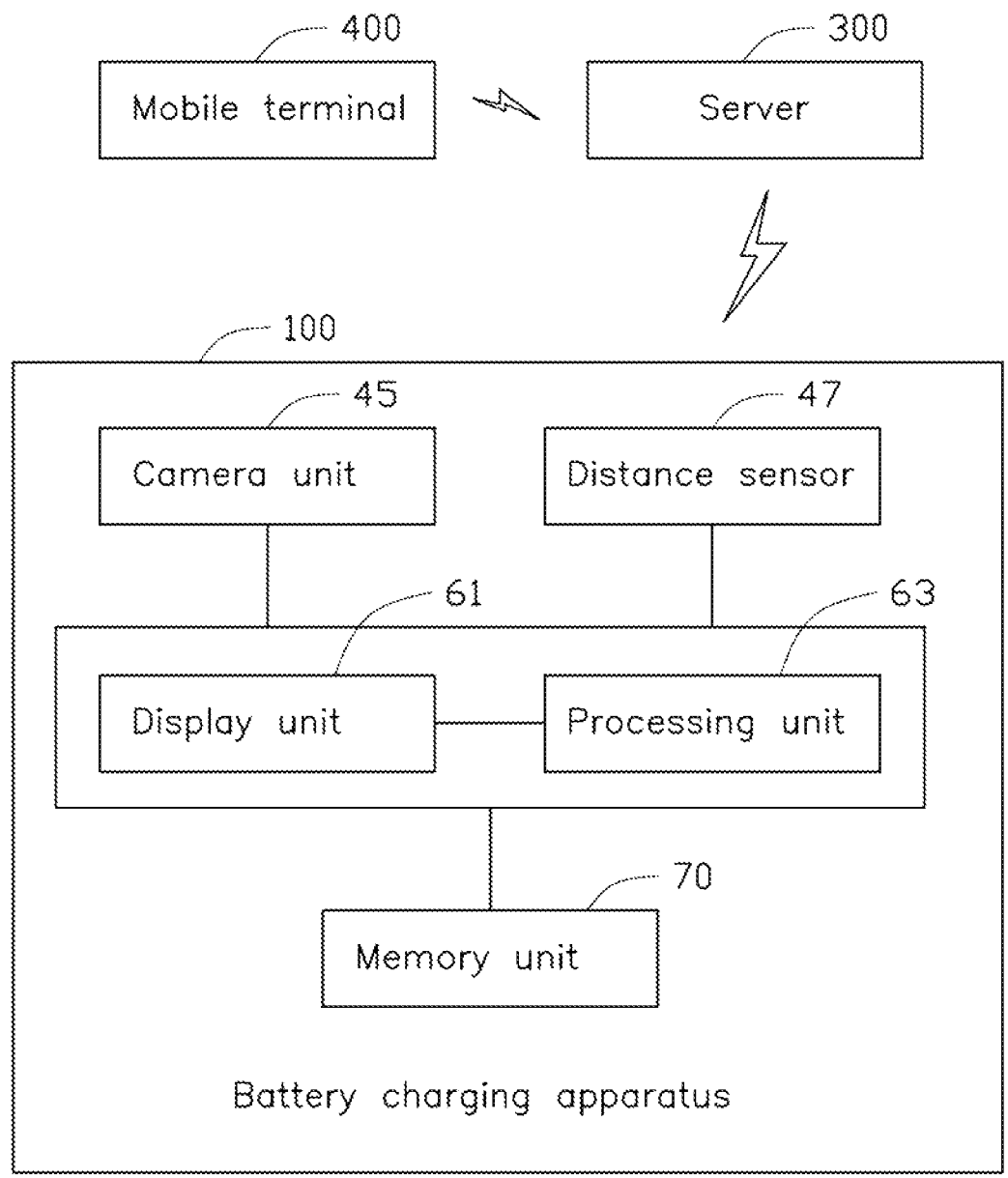
FIG. 6 is a block diagram of an embodiment of a battery charging apparatus.

Referring to FIG. 2 again, the battery charging apparatus 100 can further include a camera unit 45 positioned on an end surface of the feeding coupler 30 and positioned away from the sixth arm 26. The camera unit 45 can be used for capturing images. The battery charging apparatus 100 can further include a distance sensor 47 (as shown in FIG. 6) mounted in the charging body 10 for detecting a distance between the electrical vehicle 200 and the charging body 10, then transmit a distance signal including the distance between the electrical vehicle 200 and the charging body 10 to the controller 60.

In other embodiments, the battery charging apparatus 100 can further include a plurality of pressure sensors (not shown) positioned on the robot arm 20. The plurality of pressure sensors can transmit information to the controller 60 when the robot arm 20 contacts some object in use, the controller 60 can determine whether the robot arm 20 stop motions according to predefined conditions. In this implementation, the controller 60 can operate based on feedback received from the plurality of pressure sensors.

In other embodiments, the receiving portion 13 can be omitted, and the robot arm 20 can be directly mounted on a sidewall of the charging body 10.

As FIG. 5 shown, the electric vehicle 200 has a charging lid 202 which covers the receiving coupler 201 via a charging lid opening and closing device (not shown).

Referring to FIG. 6, the battery charging apparatus 100 can further include a memory unit 70 for storing information relating to receiving couplers of a plurality of models of electric vehicles. The memory unit 70 can be electrically coupled with the controller 60. The information relating to the receiving coupler 201 can include a image of a receiving coupler of a same or corresponding model as the electric vehicle 200, a image of a charging lid of the same or corresponding model as the electric vehicle 200 being in a close state, and positions of the receiving coupler in the same or corresponding model as the electric vehicle 200. The controller 60 can include a display unit 61 and a processing unit 63 electrically coupled with the display unit 61 and the memory unit 70. The display unit 61 can be a touch screen for displaying and input orders by manual. The number of the processing unit 63 can be one more for achieving efficiency. In other embodiments, the controller 60 can further include control keys for conveniently inputting.

In at least one embodiment, the memory unit 70 can be an internal storage system, such as a flash memory, a random access memory (RAM) for temporary storage of information, and/or a read-memory (ROM) for permanent storage of information.

In at least one embodiment, the memory unit 70 can also be a storage system, such as a hard disk, a storage card, or a data storage medium. The memory unit 70 can include volatile and/or non-volatile storage devices.

In at least one embodiment, the memory unit 70 can include two or more storage devices such that one storage device is a memory and the other storage device is a hard drive. Additionally, the memory unit 70 can be respectively located either entirely or partially external relative to the battery charging apparatus 100.

In at least one embodiment, the processing unit 63 can be a central processing unit, a digital signal processor, or a single chip, for example.

Figure 7:
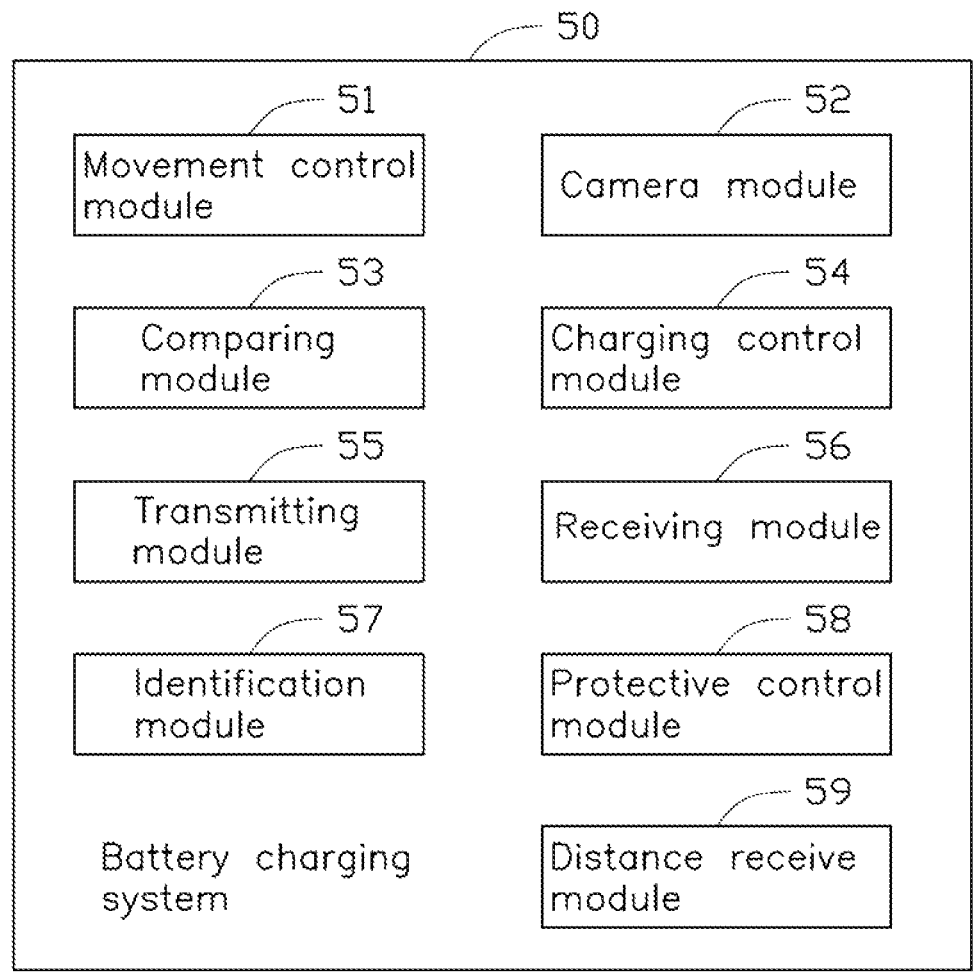
FIG. 7 is a block diagram of an embodiment of a battery charging system applied to the battery charging apparatus.

Referring to FIG. 7, a battery charging system 50 applied to the controller 60 of the battery charging apparatus 100 is illustrated. Also referring to FIG. 6 again, the battery charging apparatus 100 can communicate, wireless or through a wired connection, data with a server 300. Orders can be transmitted to the server 300 via a mobile terminal 400 by users. The battery charging system 50 can include a movement control module 51, a camera module 52, a comparing module 53, and a charging control module 54. The movement control module 51, the camera module 52, the comparing module 53, and the charging control module 54 can be executed by the processing unit 63. The modules of the battery charging system 50 also can include a hardware, integrated circuits, or software and hardware combinations, such as a special-purpose processor or a general purpose processor with special-purpose firmware.

The movement control module 51 can be used to control the robot arm 20 of the charging apparatus 100 to move.

The camera module 52 can be used to obtain an image of a location of the receiving coupler 201 captured by the camera unit 45. In detail, the camera module 52 can process the image captured by the camera unit 45 for indentify.

The comparing module 53 can be used to compare the image with a predefined image stored by the memory unit 70. The predefined image can be an open state of the receiving coupler of a same model as the electric vehicle 200. The comparing module 53 can be used to determine whether the charging lid 202 is in the open state. The comparing module 53 can be used to generate a coupling signal, to prompt that the feeding coupler 30 couples with the receiving coupler 201 via the robot arm 20 when the image is same or corresponding to the predefined image. The comparing module 53 can be further used to generate a warning signal to warn people to open the charging lid 202 when the image is not same or corresponding to the predefined image. The warning signal can be sent to the server 300 by the battery charging apparatus 100, and then relayed to the mobile terminal 400 by the server 300. In other embodiments, the warning signal can be sent to a buzzer mounted in the battery charging apparatus 100 to emit a sound, or the warning signal can be sent to a light mounted in the battery charging apparatus 100 to emit light. In other embodiments, the compare module 53 can be further used to obtain a positional deviation between the feeding coupler 30 and the receiving coupler 201 according to the image of the receiving coupler 201. When the image of the receiving coupler 201 matches the predefined image, the movement control module 51 is capable of controlling the robot arm 20 to correct positions of the feeding coupler 30 during a movement of the robot arm 20 according to the positional deviation.

The charging control module 54 can be used to control the feeding coupler 30 of the battery charging apparatus 100 to output electric current. In detail, the charging control module 54 can control the feeding coupler 30 to output electric current according to a charging signal. The charging signal or an order can be input via the display unit by manual, or from the mobile terminal 400. The charging control module 54 can stop the feeding coupler 30 from output electric current when a battery of the electric vehicle 200 is fully charged. Furthermore, the charging control module 54 can stop the feeding coupler 30 outputting electric current when the charging control module 54 receives a stop signal, from a mobile terminal 400, or a stop order input via the controller 60. The charging control module 54 can be used to generate a finish signal when the feeding coupler 30 has stopped outputting current. Then, the movement control module 51 can control the robot arm 20 to retract the feeding coupler 30 from fitting engagement with the receiving coupler 201 and close the charging lid 202 according to the finish signal. The robot arm 20 can be controlled to return the receiving portion 13 or be coupled to another electrical vehicle. In other embodiments, the charging control module 54 can control the robot arm 20 to directly return receiving portion 13 without closing the charging lid 202 after finishing charging.

The battery charging apparatus 100 can further accept a reservation request. The reservation request can be sent to the server 300 via the mobile terminal 400. The reservation request can include vehicle information, reservation time, and a vehicle location. The vehicle information can include a license plate number, a vehicle model, an identify code and other identifying information.

The server 300 can store relating information of a plurality of battery charging apparatus in one or more areas, including locations of the battery charging apparatus. The server 300 can receive a working mode of each charging apparatus 100 in real time. The working mode is in a charging state or a free state for each charging apparatus. The server 300 can distribute a fitting battery charging apparatus and transmit a signal including location of the fitting battery charging apparatus to the mobile terminal 400, according to the reservation request. The fitting battery charging apparatus can be which is nearest to the electric vehicle and can supply a charging service in the reservation time of the reservation request.

The battery charging system 50 can further include a transmitting module 55, a receiving module 56, and an identification module 57. The transmitting module 55, the receiving module 56, and an identification module 57 can be stored by the memory unit 70 for executed by the processing unit 63.

The transmitting module 55 can transmit the working mode of the charging apparatus 100 in real time to the server 300.

The receiving module 56 can receive the reservation request and transmit to the memory unit 70.

The identification module 57 can be used to identify the electrical vehicle 200 to determine whether information of electric vehicle 200 and the reservation time of the electric vehicle 200 match the information of the reservation request. In detail, the identification module 57 can compare, calculate and process the information of electric vehicle 200, reservation time of the electric vehicle 200 with the reservation request. If yes, in other words, the information of electric vehicle 200 and the reservation time of the electric vehicle 200 match the information of the reservation request, the electric vehicle 200 can be allowed to be charged. Otherwise, a charging process will be ended. The information of the electric vehicle 200, such as the vehicle plate number, can be recorded in the mobile terminal 400. The identification module 57 can be used to obtain the information of the electric vehicle 200 via wireless technology, for example BLUETOOTH™, in an allowed range from the mobile terminal 400 before charging. The identification module 57 can also obtain the information of the electric vehicle 200 via internet. In at least one embodiment, the vehicle plate number can be captured by the camera unit 45, and the identification module 57 can identify the vehicle plate number based on the image captured by the camera unit 45. In other embodiments, the information of the electric vehicle 200, the real time location of the electric vehicle can be transmitted to the server 300, and then relayed to the identification module 57.

Furthermore, a detector 500 (as shown in FIG. 5) can be positioned in a parking space corresponding to the battery charging apparatus 100. The detector 500 can detect whether the electric vehicle 200 is positioned within predetermined ranges with respect to the battery charging apparatus 100. In other words, the detector 500 can detect whether the electric vehicle 200 is positioned correctly for charging. The detector 500 can transmit a detecting signal to the movement control module 51 for starting the robot arm 20. The movement control module 51 can control the robot arm 20 move the feeding coupler 30 toward the receiving couple 201 along a predefining path, according to a predefined position of the receiving coupler of the same model as the electric vehicle 200, the predefined position of the receiving coupler of the same model as the electric vehicle 200 stored in the memory unit 70. The electric vehicle 200 usually parks in the parking space and a tire of the electric vehicle resists the stop and actuates the detector 500. If the movement control module 51 does not receive any signal from the detector 500, the robot arm 20 will not operate.

The battery charging system 50 can further include a protective control module 58 for adjusting opening or closing the protective door 40. The protective control module 58 can be stored by the memory unit 70 and further executed by the processing unit 63. In detail, the protective control module 58 also can control opening the protective door 40 when the movement control module 51 starts the robot arm 20. In other embodiments, the protective control module 58 also can receive the detecting signal from the detector 500.

The battery charging system 50 can further include a distance receiver module 59. The distance receiver module 59 can obtain a predetermined distance between the feeding coupler 30 and the electrical vehicle 200 according to the distance signal before the camera unit 45 capturing images of the receiving coupler 201.

The reservation request can be sent to the server 300 via the mobile terminal 400 by the user, when the electric vehicle 200 needs to be charged. The server 300 can distribute a fitting battery charging apparatus 100 and transmit a signal, according to the reservation request, including location of the fitting battery charging apparatus to the mobile terminal 400. The reservation request can be transmitted to the fitting battery charging apparatus 100 by the server 300. The server 300 can send information including the location position of the fitting battery charging apparatus 100.

The detector 500 can detect the electric vehicle 200 to generate the detecting signal when the electric vehicle 200 parks in the corresponding parking space to the battery charging apparatus 100. The robot arm 20 can be started and the protective door 40 can be controlled to open. The charging lid 202 can be opened by the charging lid opening and closing device or by manual. When the identification module 57 determines that vehicle information of the electric vehicle 200 and reservation time matches the reservation request, the feeding coupler 30 can be moved to the position and spaced from the electrical vehicle 200 with the predetermined distance. The camera module 52 can obtain the image of the location of the receiving coupler 201 captured by the camera unit 45. The comparing module 53 can compare the image with the predefined image stored by a memory unit 70. The movement control module 51 can control the feeding coupler 30 to couple with the receiving coupler 201 via the robot arm 20, when the image matches with the predefined image stored by a memory unit 70.

The charging control module 54 can control to charge the electric vehicle 200, according to the charging signal. The charging control module 54 can stop the feeding coupler 30 to output electric current when a battery of the electric vehicle 200 is on a full charge.

Figure 8:
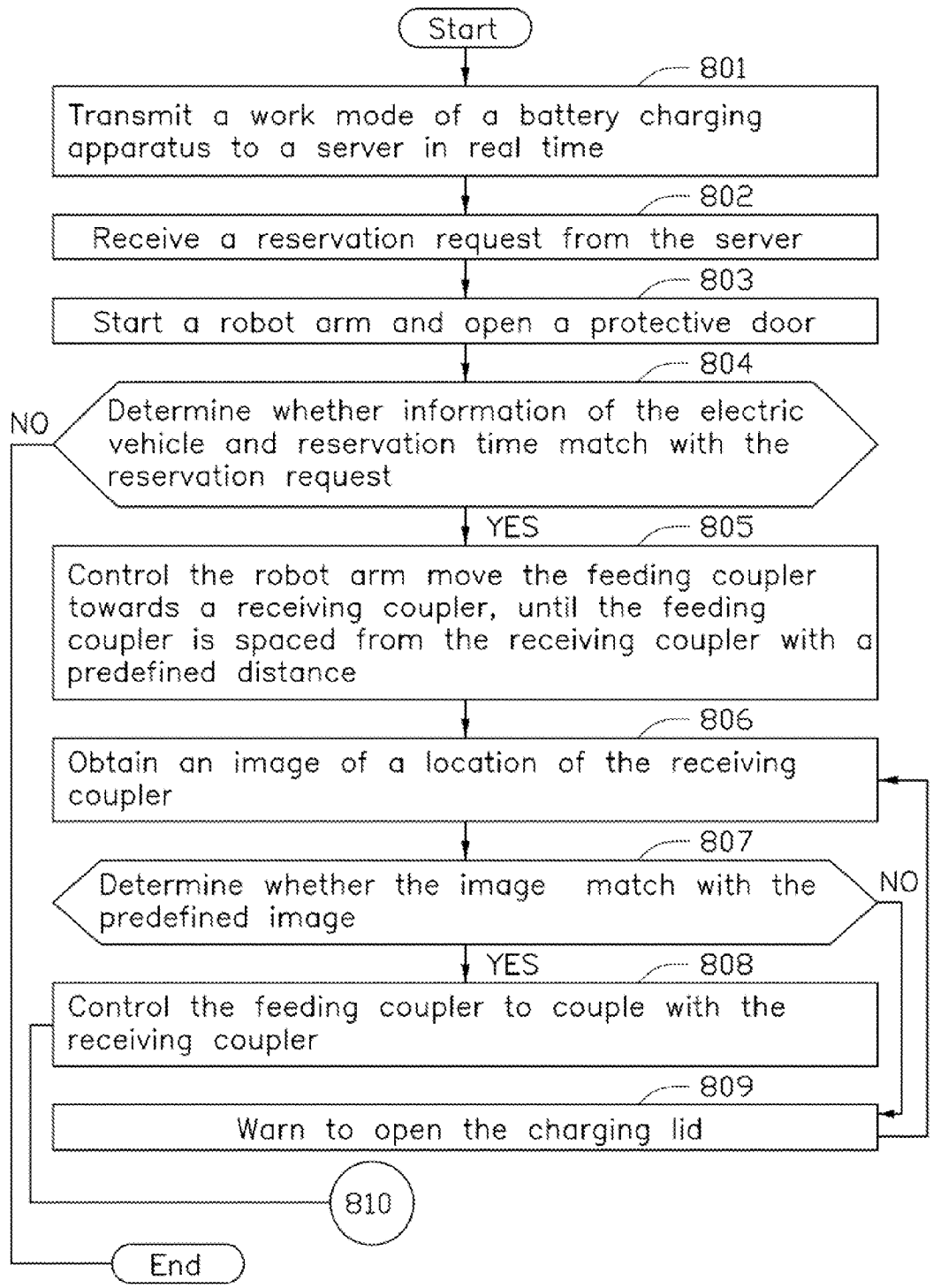
FIGS. 8 and 9 are a flowchart of an embodiment of a battery charging method.
Figure 9:
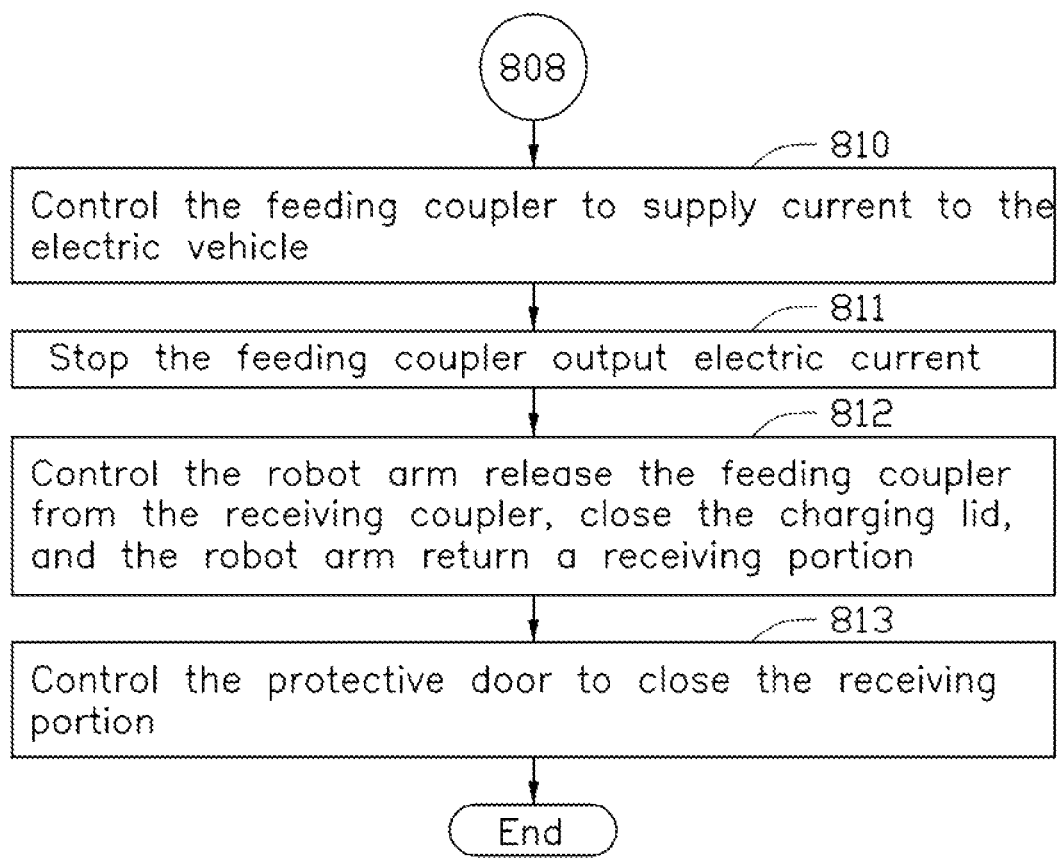

FIGS. 8 and 9 illustrate an embodiment of a flowchart of a battery charging method. The battery charging method is provided by way of example, as there are a variety of ways to carry out the method. The control method described below can be carried out using the configurations illustrated in FIG. 1, for example, and various elements of these figures are referenced in explaining the example method. Each block shown in FIG. 8 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 801.

At block 801, a working mode of a battery charging apparatus is transmitted to a server in real time, via a transmitting module of a battery charging apparatus.

At block 802, a reservation request is received from the server via a receiving module of the battery charging apparatus and the reservation request is stored in a memory unit. The reservation request can include vehicle information of the electric vehicle, reservation time, and geographical location of the electric vehicle.

At block 803, a movement control module of the battery charging apparatus starts a robot arm of the battery charging apparatus via and a door control module of the battery charging apparatus opens a protective door of the battery charging apparatus. A detecting signal sent from a detector will be transmitted to the processing unit starting the robot arm, when the detector detects that the electric vehicle is positioned within predetermined ranges with respect to the battery charging apparatus. The detector is positioned in a parking space corresponding to the battery charging apparatus. The door control module can control open the protective door, when the movement control module starts the robot arm.

At block 804, a comparing module of the battery charging apparatus determines whether information of the electric vehicle and reservation time match with the reservation request. If the information of the electric vehicle and reservation time match with the reservation request, the process goes to block 805; otherwise, the process will be ended. In detail, the comparing module identifies the electric vehicle according to the information of electric vehicle, reservation time, and the reservation request.

At block 805, the robot arm of the battery charging apparatus is controlled to move the feeding coupler of the battery charging apparatus towards a receiving coupler of the electric vehicle via the movement control module of the battery charging apparatus, until the feeding coupler arrives at a position which is spaced from the receiving coupler with a predefined distance. The movement control module of the battery charging apparatus can obtain a predefined path for the robot arm, according to a predefined position of a receiving coupler of a same model as the electric vehicle, when the electric vehicle is positioned within predetermined ranges with respect to the battery charging apparatus. The predefined position of the receiving coupler of the same model as the waiting charging electric vehicle can be stored in a memory unit. The charging control module can control the robot arm and the feeding coupler move along the predefined path, until the feeding coupler is distanced from the receiving coupler with the predefined distance.

At block 806, an image of a location of the receiving coupler is obtained. The camera module controls the camera unit of the battery charging apparatus to capture the image of the location of the receiving coupler and transmit to a comparing module of the battery charging apparatus.

At block 807, the image of the location of the receiving coupler of the electric vehicle is compared with a predefined image, and determine whether the image of the receiving coupler match the predefined image. The predefined image is the receiving coupler of a same model as the electric vehicle, when a charging lid of the same model as the electric vehicle, is in an open state. The comparing module can determine whether the image match with the predefined image, according to the image of the location of the receiving coupler of the electric vehicle and the predefined image. If yes, the process goes to a block 808; if no, the process goes to a block 809.

At block 808, the feeding coupler is controlled to couple with the receiving coupler via the robot arm, when the image of the receiving coupler matches the predefined image. The movement control module controls the robot arm couple with the receiving coupler.

At block 809, the charging lid is warned to open and return the block 806. The comparing module sends a warning signal to warn people open the charging lid.

At block 810, the feeding coupler is controlled supply current to the electric vehicle. A charging control module of the battery charging apparatus can control the feeding coupler to output electric current according to a charging signal. The charging signal can be an order input via the processing unit by manual, or from the mobile terminal.

At block 811, the feeding coupler is stopped to output electric current. The charging control module can stop the feeding coupler output electric current when a battery of the electric vehicle has been on a full charge. Furthermore, the charging control module can stop the feeding coupler output electric current when receiving a sop signal from the processing unit by manual, or from the mobile terminal.

At block 812, the robot arm is controlled to release the feeding coupler from the receiving coupler, control the robot arm close the charging lid, and control the robot arm return a receiving portion of the battery charging apparatus. The charging control module controls the robot arm release the feeding coupler from the receiving coupler, controls the robot arm close the charging lid, and controls the robot arm return the receiving portion, according a finish signal from the charging control module.

At block 813, the protective door is controlled to close the receiving portion.

In other embodiments, the block 801, the block 802, the block 804 can be omitted, when the transmitting module, the receiving module, and the identification module of the battery charging apparatus are omitted.

In other embodiments, the block 809 can be omitted, when the battery charging apparatus does not have a function that warning to open the charging lid.

In other embodiments, the robot arm 20 can be started by the processing unit 63 or other signal, such as an order from the mobile terminal.

In other embodiments, the memory unit 70 of the battery charging apparatus can be omitted, the battery charging apparatus can couple with an outer memory unit, such that information relating to a receiving coupler of a plurality of models of electric vehicles, and other data can be stored in the outer storage.

In other embodiments, images of closing charging lids for the plurality of electric vehicles can be also storied in the memory unit. The charging lid is closed, when the image of the location of the receiving coupler matches with a corresponding one image for a closing charging lid of a same model as the electric vehicle.

In other embodiments, the protective door 40 can be omitted, and the protective control module 58 can be omitted correspondingly.

Figure 10:
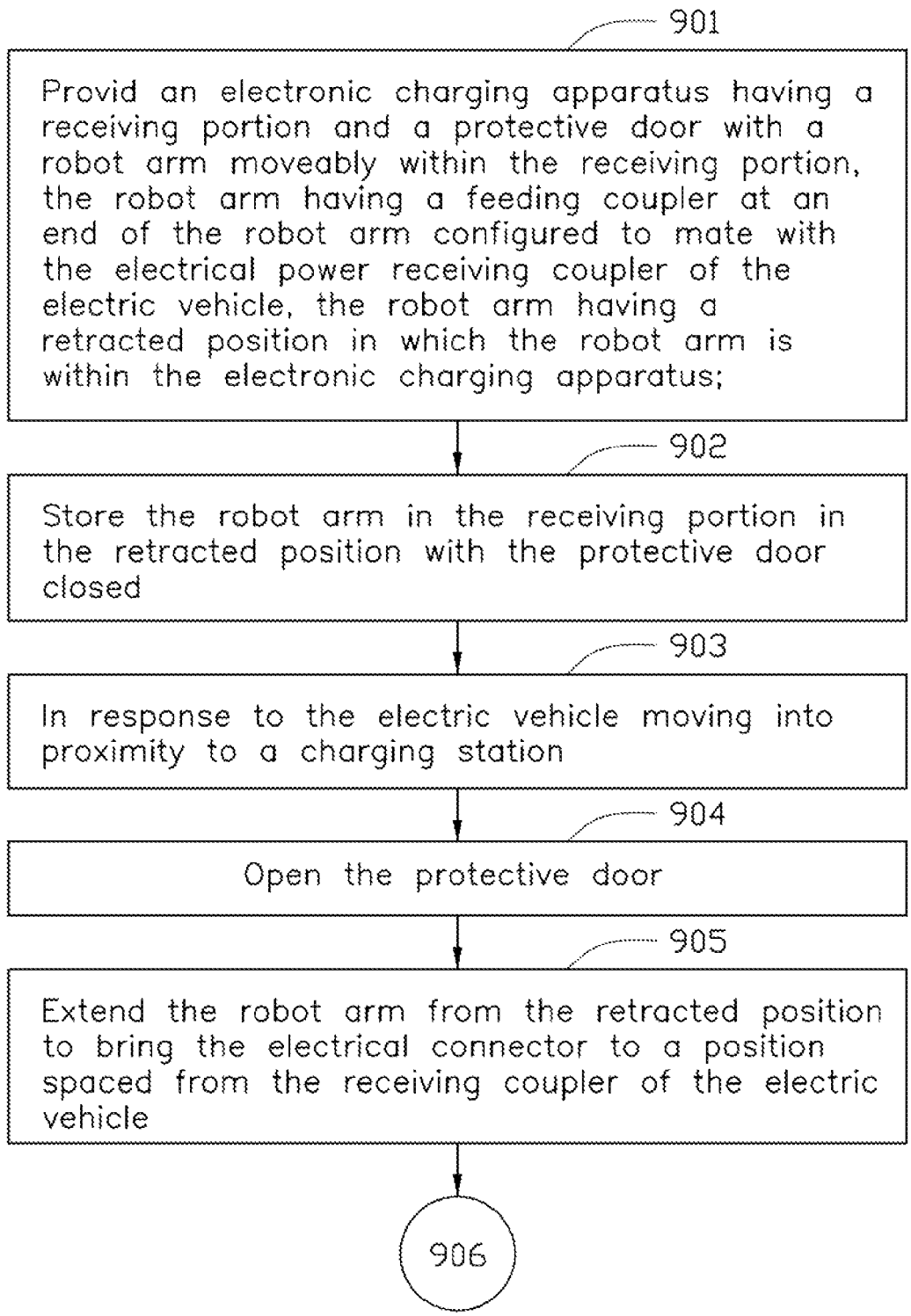
FIGS. 10 and 11 are a flowchart of another embodiment of a battery charging method.
Figure 11:
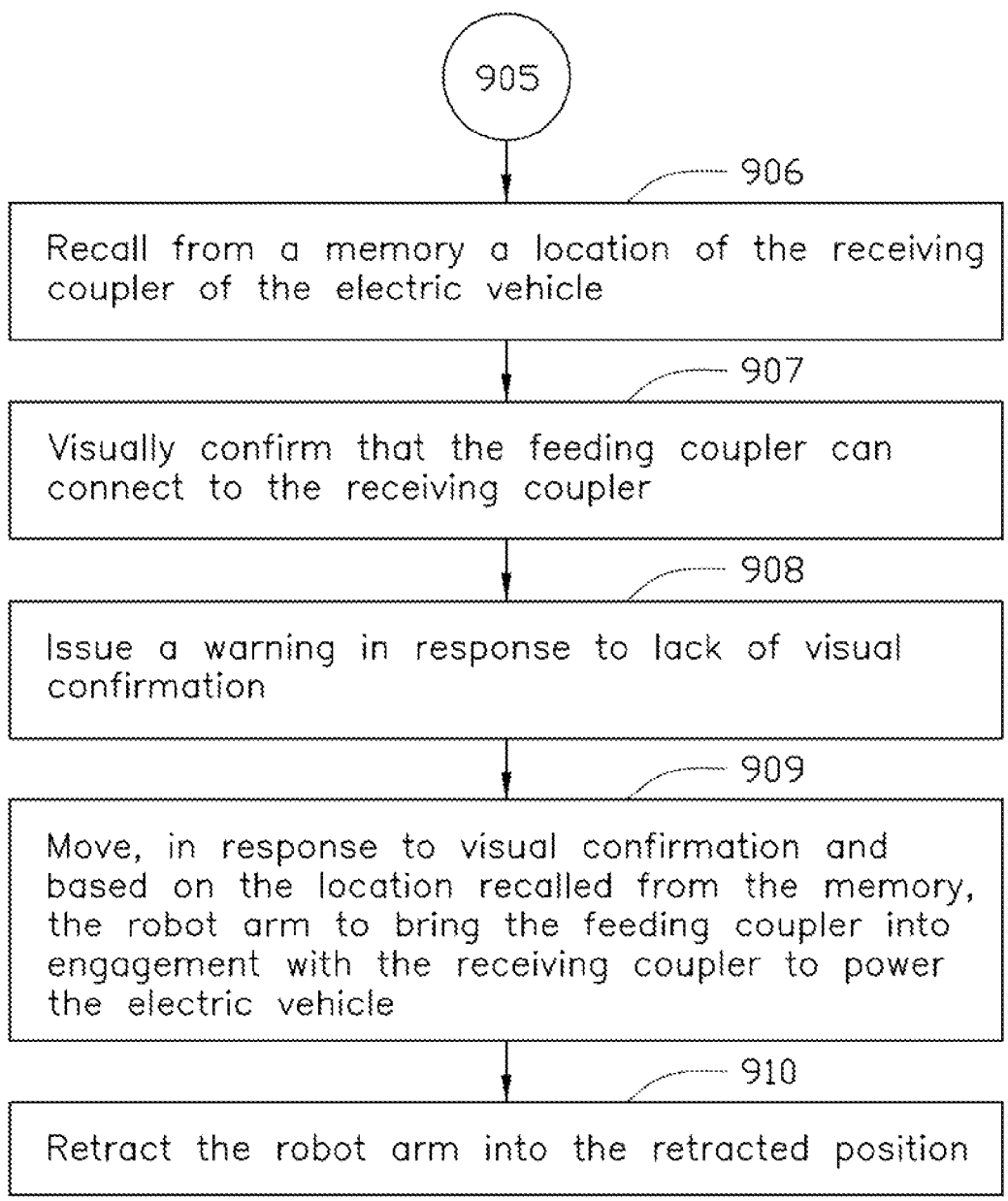

FIGS. 10 and 11 illustrate another embodiment of a flowchart of a battery charging method. The battery charging method is provided by way of example, as there are a variety of ways to carry out the method. The control method described below can be carried out using the configurations illustrated in FIG. 1, for example, and various elements of these figures are referenced in explaining the example method. Each block shown in FIGS. 10 and 11 represent one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 901.

At block 901, an electronic charging apparatus can be provided, and the electronic charging apparatus can have a receiving portion and a protective door with a robot arm moveably within the receiving portion. The robot arm can have a feeding coupler at an end of the robot arm configured to mate with the electrical power receiving coupler of the electric vehicle. The robot arm can have a retracted position in which the robot arm is within the electronic charging apparatus.

At block 902, the robot arm can be stored in the receiving portion in the retracted position with the protective door closed.

At block 903, the electronic charging apparatus can be in response to the electric vehicle moving into proximity to a charging station.

At block 904, the protective door can be opened.

At block 905, the robot arm can be extended from the retracted position to bring the feeding coupler to a position spaced from the receiving coupler of the electric vehicle.

At block 906, a location of the receiving coupler of the electric vehicle can be recalled, the location can be stored in a memory unit.

At block 907, the feeding coupler whether can connect to the receiving coupler can be visually confirmed.

At block 908, a warning can be issued in response to lack of visual confirmation. In response to visual confirmation and based on the location recalled from the memory.

At block 909, the robot arm can be moved to bring the feeding coupler into engagement with the receiving coupler to power the electric vehicle.

At block 910, the robot arm can be retracted into the retracted position.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A battery charging system for an electric vehicle comprising:
   at least one processing unit; and
   a plurality of modules coupled to the at least one processing unit, each of the plurality of modules including instructions to be executed by one or more of the at least one processing unit, the plurality of modules comprising:
      a movement control module configured to cause the at least one processing unit to control a robot arm of a charging apparatus to move;
      a charging control module configured to cause the at least one processing unit to control a feeding coupler of the battery charging apparatus to output electric current;
      a camera module configured to cause the at least one processing unit to obtain an image of a location of a receiving coupler of the electric vehicle; and
      a comparing module configured to cause the at least one processing unit to compare the image with a predefined image stored by a memory unit, the predefined image being of an open state of a receiving coupler of a same model as the electric vehicle,
   wherein the movement control module is further configured to control the feeding coupler to couple with the receiving coupler when the image of the location of the receiving coupler matches the predefined image.

2. The battery charging system of claim 1, wherein the movement control module is capable of controlling the robot arm move the feeding coupler towards the receiving coupler, according to a predefined position of the receiving coupler of the same model as the electric vehicle, the predefined position of the receiving coupler of the same model as the electric vehicle stored in the memory unit.

3. The battery charging system of claim 2, wherein when the image of the receiving coupler matches the predefined image, the compare module is configured to obtain a positional deviation between the feeding coupler and the receiving coupler according to the image of the location of the receiving coupler and transmit a coupling signal comprising the positional deviation to the movement control module, the movement control module is capable of controlling the robot arm correct positions of the feeding coupler during moving.

4. The battery charging system of claim 1 further comprising a transmitting module, wherein the transmitting module is configured to cause the at least one processing unit to transmit a working mode of the charging apparatus in real time to a server.

5. The battery charging system of claim 1 further comprising a receiving module, wherein the receiving module is configured to cause the at least one processing unit to receive a reservation request and transmits to the memory unit.

6. The battery charging system of claim 5 further comprising an identification module, wherein the identification module is configured to determine whether information of electric vehicle and reservation time match information of the reservation request.

7. The battery charging system of claim 1, wherein the movement control module is further configured to receive a detecting signal from a detector to start the robot arm, the detector is configured to detect whether the electric vehicle is positioned within predetermined ranges with respect to the battery charging apparatus when the a tire of the electric vehicle actuates the detector.

8. The battery charging system of claim 1 further comprising a door control module 58, wherein the door control module is configured to control a protective door open or close.

9. A battery charging apparatus for an electric vehicle comprising:
   a charging body;
   a robot arm movably coupled to the charging body;
   a feeding coupler coupled to the robot arm and configured to supply electric power to the electric vehicle;
   a camera unit coupled to the feeding coupler and configured to capture an image of a location of a receiving coupler of the electric vehicle; and
   a controller comprising:
      at least one processing unit; and
      a plurality of modules coupled to the at least one processing unit, each of the plurality of modules including instructions to be executed by one or more of the at least one processing unit, the plurality of modules comprising:
         a movement control module configured to control the robot arm to move;
         a charging control module configured to control the feeding coupler to output electric current;
         a camera module configured to obtain an image of the location of the receiving coupler from the camera unit; and
         a comparing module configured to compare the image with a predefined image stored by a memory unit, the predefined image being of an open state of a receiving coupler of a same model as the electric vehicle,
      wherein the movement control module controls, when the image matches with the predefined image, the feeding coupler to couple to the receiving coupler.

10. The battery charging apparatus of claim 9, wherein the movement control module is capable of controlling the robot arm move the feeding coupler towards the receiving coupler, according to a predefined position of the receiving coupler of the same model as the electric vehicle, the predefined position of the receiving coupler of the same model as the waiting charging electric vehicle is stored in the memory unit.

11. The battery charging apparatus of claim 10, wherein when the image matches the predefined image, the compare module is configured to obtain a positional deviation between the feeding coupler and the receiving coupler according to the image and transmit a coupling signal comprising the positional deviation, the movement control module is capable of controlling the robot arm correct positions of the feeding coupler during moving according to the coupling signal.

12. The battery charging apparatus of claim 9, wherein the processing unit further comprises a transmitting module, the transmitting module is configured to transmit a working mode of the charging apparatus in real time to a server.

13. The battery charging apparatus of claim 9, wherein the processing unit further comprises a receiving module configured to receive a reservation request and the reservation request is stored in the memory unit.

14. The battery charging apparatus of claim 13, wherein the processing unit further comprises an identification module, the identification module is configured to determine whether information of electric vehicle and reservation time matches information of the reservation request.

15. The battery charging apparatus of claim 9, wherein the movement control module is further configured to receive a detecting signal from a detector to start the robot arm, the detector is configured to detect whether the electric vehicle is positioned within predetermined ranges with respect to the battery charging apparatus when the a tire of the electric vehicle actuates the detector.

16. The battery charging apparatus of claim 9, the battery charging apparatus further comprises a protective door movably coupled to a sidewall of the charging body and configured to close the receiving portion, the charging body defines a receiving portion, the robot arm is capable of being received in the receiving portion.

17. The battery charging apparatus of claim 16, wherein the processing unit further comprises a door control module, and the door control module is configured to control the protective door to open or close.

18. A battery charging method, comprising:
controlling a robot arm of the battery charging apparatus move the feeding coupler of the battery charging apparatus towards a receiving coupler of an electric vehicle, the feeding coupler spaced from the receiving coupler with a predefined distance;
obtaining an image of the receiving coupler;
comparing the image with a predefined image and determine whether the image matches with the predefined image, the predefined image being of an open state of a receiving coupler of a same model as the electric vehicle;
controlling the feeding coupler couple with the receiving coupler via the robot arm, when the image of the receiving coupler matches the predefined image;
controlling the feeding coupler supply current to the electric vehicle;
stopping to output electric current; and
controlling the robot arm to release the feeding coupler from the receiving coupler.

19. The battery charging method of claim 18, wherein before controlling a robot arm of the battery charging apparatus move the feeding coupler to and align with a receiving coupler of the electric vehicle, the battery charging method further comprising:
transmitting a working mode of the battery charging apparatus to a server;
receiving a reservation request from the server, the reservation request comprising vehicle information of the electric vehicle, reservation time, and geographical location of the electric vehicle; and
determining whether information of electric vehicle and reservation time match information of the reservation request.

20. The battery charging method of claim 18, wherein before controlling a robot arm of the battery charging apparatus move the feeding coupler to and align with a receiving coupler of the electric vehicle, the battery charging method further comprising:
controlling open a protective door of the battery charging apparatus and start the robot arm when the electric vehicle resists a detector positioned in a parking space corresponding to the charging apparatus.

* * * * *